July 4, 1961

TERMACHOS PATZIAS
NOW BY CHANGE OF NAME
TERRY PATZIAS
METHOD OF RECOVERING POTASSIUM SULPHATE
FROM CEMENT KILN FLUE DUST

Filed Dec. 1, 1959

INVENTOR.
TERMACHOS PATZIAS
BY

INVENTOR.
TERMACHOS PATZIAS

July 4, 1961

TERMACHOS PATZIAS
NOW BY CHANGE OF NAME
TERRY PATZIAS
METHOD OF RECOVERING POTASSIUM SULPHATE
FROM CEMENT KILN FLUE DUST 2,991,154

Filed Dec. 1, 1959

FIG. 4  FLOW SHEET FOR THE RECOVERY OF $K_2SO_4$ FROM CEMENT FLUE DUST.

200 Tons Dust
600 " Water $K_2SO_4$ 33.2 Tons
Inert 166.8 "

EXTRACTION

Solution 629.6 Tons
Inert 170.4 "

Wash-water 280 Tons

Cake  Inert 172.1 Tons
      Water 287.9 "

FILTRATION $K_2SO_4$ 27.9 Tons
Water 592.1 "

Water 480 Tons $K_2SO_4$ 27.9 Tons
Water 112.1 "

EVAPORATION

Neutraliz. $H_2SO_4$

Mother Liquor  $K_2SO_4$ 12.12 Tons
               Water 109.12 "

CRYSTALLIZATION

Water 1.20 Tons

DRYING $K_2SO_4$ 27.9 Tons

INVENTOR.
TERMACHOS PATZIAS
BY
Robert A. Sloman

United States Patent Office 2,991,154
Patented July 4, 1961

2,991,154
METHOD OF RECOVERING POTASSIUM SULPHATE FROM CEMENT KILN FLUE DUST
Termachos Patzias, now by change of name Terry Patzias, 316 County St., Milan, Mich.
Filed Dec. 1, 1959, Ser. No. 856,550
6 Claims. (Cl. 23—121)

This invention relates to the leaching of cement flue dust and more particularly to a process for the recovery of potassium sulphate from cement rotary kiln flue dusts.

The present invention relates to a method of extraction and recovery of potassium sulphate from cement kiln flue dust collected by electrostatic precipitators.

The cement industry is an industry manufacturing a product which is itself a fine powder. Thereof it is always faced with the problem of collecting great amounts of dusts as well as of returning or discarding them. The handling of raw materials, the grinding of the cement clinker, and the packing of the finished product, are operations which all require dust control. But the main and most important dust problem in a cement plant occurs in the rotary kiln itself.

The dust carried by the gases from the rotary kiln originates from the raw materials before they are turned into clinker and consists mainly of unburned raw material, small amounts of ash from the combustion of coal, partially calcined material and certain volatile products as the alkalies.

While all of this dust is valuable and cement plant operators are interested in collecting and recycling it to the burning process, not even the fraction collected by electrostatic precipitators can be returned because it contains too much alkali. Even so, dust collection must be made in order to avoid prosecution by the State for air pollution. In most plants then, recycling of precipitator dust is not usually practiced, and such dust then requires disposal by other means which are always expensive.

It is an object of the present invention to provide a method of recovering the potash (potassium oxide) content of this dust economically for use as a potassium fertilizer. The removal of alkalies from said flue dusts is upmost to cement manufacturers for the reason that alkalies in cement may react with some constituents of siliceous aggregates in concrete in such manner as to damage the structure.

Extensive expansion of concrete may occur through chemical reactions between cement of high alkali content and mineral constituents in some aggregates. Accordingly, it is desirable that alkalies like sodium oxide and potassium oxide be minimized in the clinker from which the cement is produced.

It is another object of the present invention to provide a process by which such oxides may be separated and removed from the flue dust before returning the same to the raw mixture for recycling to the kiln.

These and other objects will be seen from the following specification and claims in conjunction with the appended drawings in which:

FIG. 4 is a flow chart diagrammatically indicating the present method.

It will be understood that the above drawings are merely illustrative and that variations therein are contemplated within the scope of the claims hereafter set forth.

The particle size of the dust ranges from 0.1 to 100 microns in diameter. The dust carried by the gases through the rotary kiln passes through the collecting equipment where it is partially deposited. The coarsest part of the dust is deposited in the settling chamber. The fraction collected by the electrostatic precipitators is the smallest in size and the richest in alkali content.

The chemical composition of the cement kiln dust depends upon the composition of the raw mixture and fuel used. The alkali content ranges from 5 percent to 12 percent in potash, ($K_2O$) up to 1 percent in soda, and the largest part of these alkalies is combined with the sulphur tri-oxide to form potassium and sodium sulphate, and the lesser part is combined with alumina and silica forming alkali-aluminosilicates, because of the partial calcination of the material.

The alkalies in the rotary kiln are derived from the raw mixture and from the ash of pulverized coal, if coal is used, and tend to be volatilized in the high temperature portions of the kiln, and to accumulate in the flue-dust.

Cement kiln flue dust is not easily decomposed by mineral acids. Fusion or special digestion is required to bring the alkalies completely into solution.

The average analysis of the raw kiln dusts indicates the following:

| Constituents: | Weight percent |
|---|---|
| $SiO_2$ | 16.06 |
| $CaO$ | 35.80 |
| $MgO$ | 2.92 |
| $SO_3$ | 6.56 |
| $K_2O$ | 8.96 |
| $Na_2O$ | 2.26 |
| $Fe_2O_3 + Al_2O_3$ | 9.82 |
| Loss on ignition | 16.84 |
| Total | 99.22 |

The important variables involved in the extraction process were the time of contact, the ratio of liquid to solid and the temperature of the mixture. A series of experiments were conducted at the temperature of the boiling solution for fixed ratios of water to dust: 2 to 1, 2.5 to 1, 3 to 1, 5 to 1, 10 to 1, each of which were maintained at a temperature of 212° F. for varying periods of time: 15, 30, 45, 60 minutes.

Figure 1:
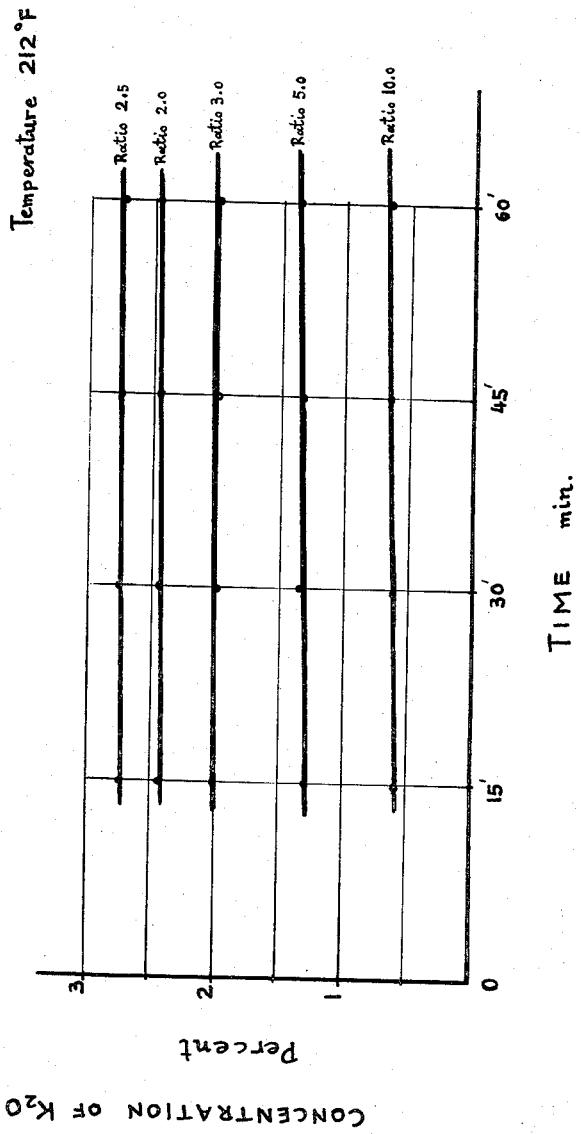
FIG. 1 is a graph diagram indicating the percentage concentration of potassium oxide from cement flue dust at different times and in different solutions.

After extraction, the mixtures were filtered and the quantity of filtrate was the same for the same ratio, since the amount of solid was constant in every case at 10 grams. Several samples were anlyzed by means of the flame spectrophotometer. (See Table I and Fig. 1.)

TABLE I
*Extraction data for constant temperature (212° F.)*

| Sample Identification | | | Ratio of Water/Dust | Time of Treat., Min. | Relative Emittance for K₂O | Concentration of K₂O | |
|---|---|---|---|---|---|---|---|
| No. | Filtrate, ml. | Dilution | | | | P.p.m. | Percent |
| 1 | 8 | 1:4,000 | 2.0 | 15 | 62 | 6.1 | 2.44 |
| 2 | 8 | 1:4,000 | 2.0 | 30 | 62 | 6.1 | 2.44 |
| 3 | 8 | 1:4,000 | 2.0 | 45 | 62 | 6.1 | 2.44 |
| 4 | 8 | 1:4,000 | 2.0 | 60 | 63 | 6.2 | 2.48 |
| 5 | 12 | 1:4,000 | 2.5 | 15 | 69 | 6.8 | 2.72 |
| 6 | 12 | 1:4,000 | 2.5 | 30 | 70 | 6.9 | 2.76 |
| 7 | 12 | 1:4,000 | 2.5 | 45 | 70 | 6.9 | 2.76 |
| 8 | 12 | 1:4,000 | 2.5 | 60 | 70 | 6.9 | 2.76 |
| 9 | 16 | 1:2,000 | 3.0 | 15 | 100 | 10.0 | 2.00 |
| 10 | 16 | 1:2,000 | 3.0 | 30 | 101 | 10.1 | 2.02 |
| 11 | 16 | 1:2,000 | 3.0 | 45 | 102 | 10.2 | 2.04 |
| 12 | 16 | 1:2,000 | 3.0 | 60 | 103 | 10.3 | 2.06 |
| 13 | 36 | 1:2,000 | 5.0 | 15 | 66 | 6.5 | 1.30 |
| 14 | 36 | 1:2,000 | 5.0 | 30 | 66 | 6.5 | 1.30 |
| 15 | 36 | 1:2,000 | 5.0 | 45 | 68 | 6.8 | 1.36 |
| 16 | 36 | 1:2,000 | 5.0 | 60 | 70 | 6.9 | 1.38 |
| 17 | 86 | 1:1,000 | 10.0 | 15 | 61 | 6.0 | 0.60 |
| 18 | 86 | 1:1,000 | 10.0 | 30 | 64 | 6.3 | 0.63 |
| 19 | 86 | 1:1,000 | 10.0 | 45 | 67 | 6.6 | 0.66 |
| 20 | 86 | 1:1,000 | 10.0 | 60 | 67 | 6.6 | 0.66 |

The result of these experiments made it clear that the time of extraction bore little result to the ultimate concentration of the solution. Since there was no greater extraction after one hour, an intermediate time of 30 minutes was selected for a second experiment at 212 degrees F. in order to determine the optimum ratio of liquid to solids for maximum concentration of potassium oxide of the solution.

For the potassium oxide concentration of the solution, a series of nine (9) ratios of dust to water were prepared and extractions of potassium sulphate were made for thirty minute periods at 212° F. The quantity of dust was constant at 10 grams and the ratios were 1:5; 1:75; 2; 2.5; 3; 3.5; 5; 8 and 10 parts of water to 1 part of dust.

Figure 2:
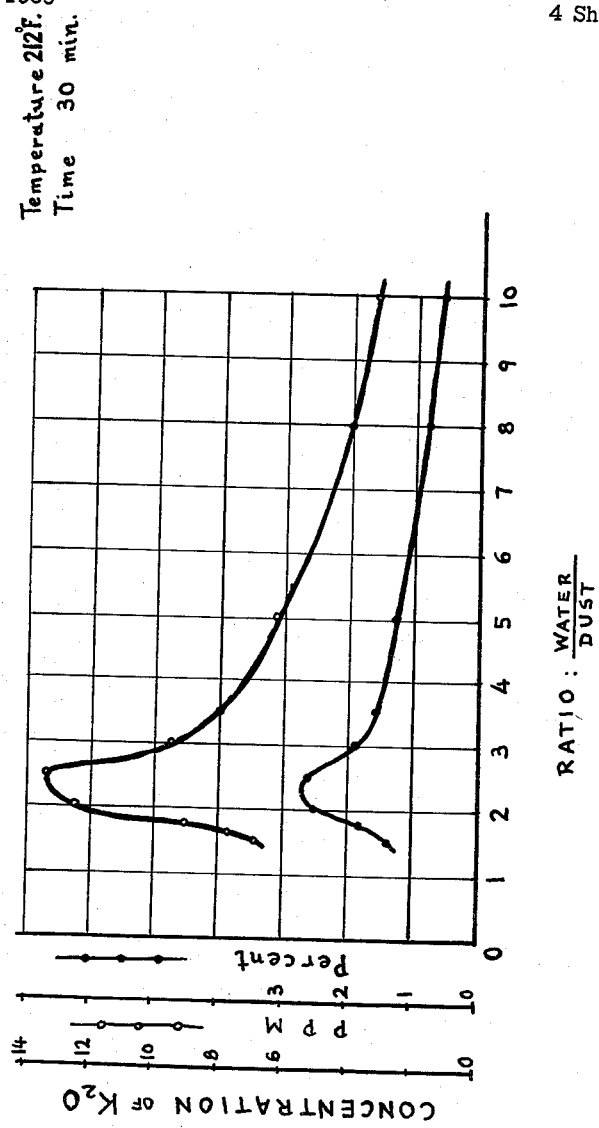
FIG. 2 is a graph diagram indicating percentage concentration of potassium oxide from cement flue dust from different solutions at constant temperature.

The foregoing experiment indicated that a maximum concentration of potassium oxide occurs where the ratio of liquid to solids was 2.5 to 1. (See Table II and FIG. 2).

TABLE II
*Extraction data for constant temperature (212° F.) and time*

| Sample | | | Ratio of Water/Dust | Relative Emittance for K₂O | Concentration of K₂O | |
|---|---|---|---|---|---|---|
| No. | Filtrate, ml. | Dilution | | | P.p.m. | Percent |
| 1 | 3 | 1:2,000 | 1.50 | 71 | 7.0 | 1.40 |
| 2 | 5 | 1:2,000 | 1.75 | 92 | 9.1 | 1.82 |
| 3 | 8 | 1:4,000 | 2.0 | 64 | 6.3 | 2.52 |
| 4 | 12 | 1:4,000 | 2.5 | 68 | 6.7 | 2.60 |
| 5 | 16 | 1:2,000 | 3.0 | 95 | 9.5 | 2.00 |
| 6 | 20 | 1:2,000 | 3.5 | 81 | 8.0 | 1.70 |
| 7 | 36 | 1:2,000 | 5.0 | 64 | 6.3 | 1.26 |
| 8 | 66 | 1:1,000 | 8.0 | 81 | 8.0 | 0.80 |
| 9 | 86 | 1:1,000 | 10.0 | 66 | 6.5 | 0.65 |

Figure 3:
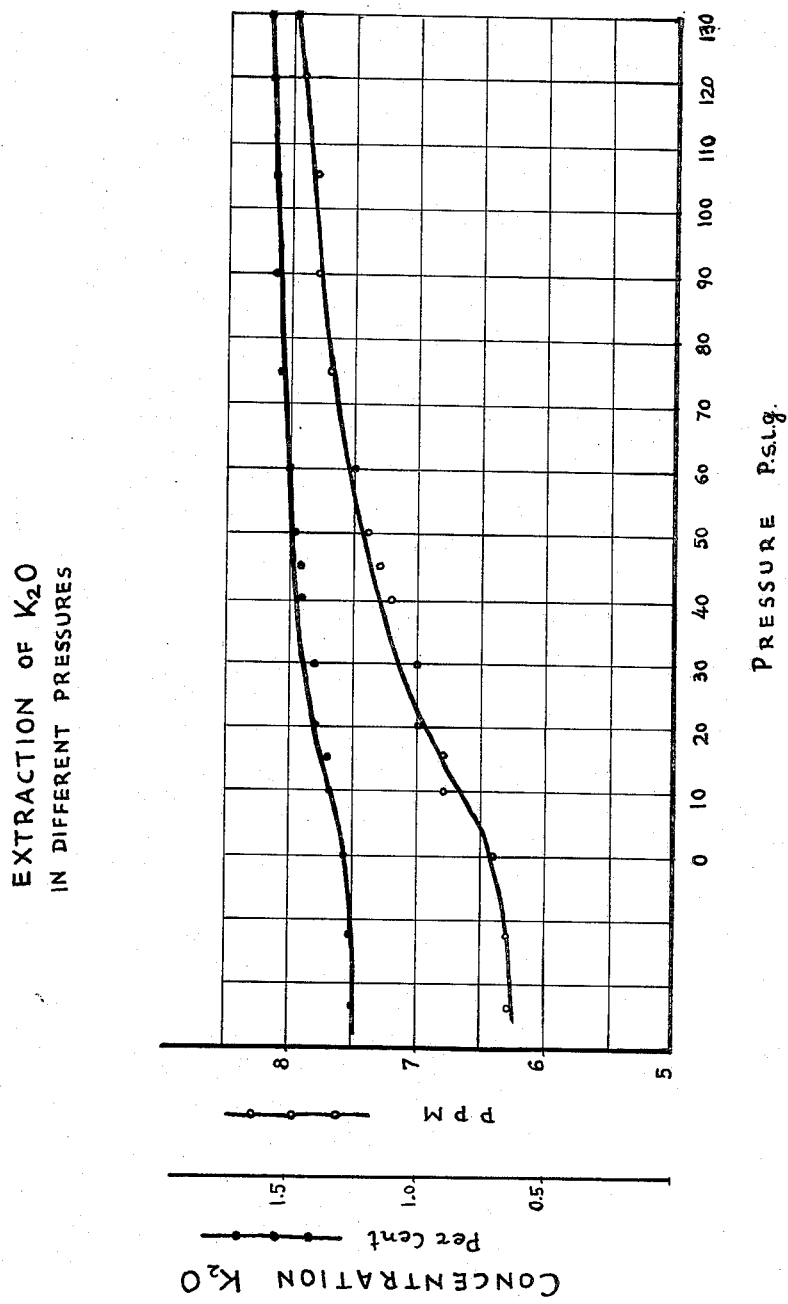
FIG. 3 is a graph diagram indicating concentration of potassium oxide from cement flue dust for different pressures.

For the temperature of extraction another series of tests (16) were made to illustrate the effect of temperature upon the concentration of the solutions obtained. A fixed ratio of liquid to solid, 5 to 1, was used and the mixtures were treated for 30 minutes at temperatures of 140, 176, 212, 240, 250, 259, 274, 287, 293, 298, 307, 320, 330, 340, 350 and 358° F., in an autoclave of stainless steel. (See Table III and FIG. 3.)

TABLE III
*Effect of temperature on extraction*

| Sample Identification | | | Heat Treatment | | Relative Emittance for K₂O | Concentration of K₂O | |
|---|---|---|---|---|---|---|---|
| No. | Filtrate, ml. | Dilution | Pres., p.s.i.g. | Temp., °F. | | P.p.m. | Percent |
| 1 | 36 | 1:2,000 | 0 | 140 | 64 | 6.3 | 1.26 |
| 2 | 36 | 1:2,000 | 0 | 176 | 64 | 6.3 | 1.26 |
| 3 | 36 | 1:2,000 | 0 | 212 | 65 | 6.4 | 1.28 |
| 4 | 36 | 1:2,000 | 10 | 240 | 69 | 6.8 | 1.36 |
| 5 | 36 | 1:2,000 | 15 | 250 | 69 | 6.8 | 1.36 |
| 6 | 36 | 1:2,000 | 20 | 259 | 70 | 7.0 | 1.40 |
| 7 | 36 | 1:2,000 | 30 | 274 | 70 | 7.0 | 1.40 |
| 8 | 36 | 1:2,000 | 40 | 287 | 73 | 7.2 | 1.44 |
| 9 | 36 | 1:2,000 | 45 | 293 | 74 | 7.3 | 1.46 |
| 10 | 36 | 1:2,000 | 50 | 298 | 75 | 7.4 | 1.48 |
| 11 | 36 | 1:2,000 | 60 | 307 | 76 | 7.5 | 1.50 |
| 12 | 36 | 1:2,000 | 75 | 320 | 78 | 7.7 | 1.54 |
| 13 | 36 | 1:2,000 | 90 | 330 | 79 | 7.8 | 1.56 |
| 14 | 36 | 1:2,000 | 105 | 340 | 79 | 7.8 | 1.56 |
| 15 | 36 | 1:2,000 | 120 | 350 | 80 | 7.9 | 1.58 |
| 16 | 36 | 1:2,000 | 135 | 358 | 81 | 8.0 | 1.60 |

It is obvious that temperature in the low range has no effect on the degree of extraction of potassium oxide. But it is demonstrated that the concentration increases rapidly with increasing pressure and temperature. This effect is quite probably due to the fact that the alkali-aluminosilicates are decomposed by the steam treatment and are completely hydrolyzed according to the reactions:

K₂SiO₃ plus H₂O=2KOH plus SiO₂ (Colloid)
K₂Al₂O₄ plus 4H₂O=2KOH plus 2Al (OH)₃ (Colloid)
Na₂SiO₃ plus H₂O=2NaOH plus SiO₂ (Colloid)
Na₂Al₂O₄ plus 4H₂O=2NaOH plus 2Al(OH)₃ (Colloid)

The potassium and sodium hydroxides react with sulphuric acid to produce potassium and sodium sulphate as follows:

2KOH plus H₂SO₄=K₂SO₄ plus 2H₂O
2NaOH plus H₂SO₄=Na₂SO₄ plus 2H₂O

For all of the heat-treatments of the dust mixtures, a stainless steel autoclave was used, and for all the potassium oxide determinations of the extracted solutions, a Beckman flame spectrophotometer was used, which was calibrated against standard solutions containing proportional amounts of calcium, comparable to these existing in the dust solutions.

RESULTS OF EXPERIMENTATIONS (1) For the effect of the time of extraction upon the potassium sulphate concentration of the resulting solutions, it was found that the extraction at 212° F. is not affected by the time, since the potassium sulphate is water soluble.

(2) For the effect of the solid to liquid ratio upon the concentration of the extracted solutions, it is noteworthy that the concentration of potassium oxide is maximized when the dust is extracted with approximately two-and-a-half-times its quantity of water.

Below this quantity of water, the extraction seems to be incomplete, since the mixing and filtration is very difficult, due to the thickness of the mixture. Extraction with greater amounts of water results in dilute solutions and then great amounts of solutions have to be handled and evaporated.

(3) For the effect of the temperature of the mixture upon the concentration of the extracted solution it was found that the concentration of potassium oxide increases with the pressure and temperature of the steam. From a concentration of 1.26 percent at atmospheric pressure concentration reached a maximum of 1.60 percent at 135 pounds per square inch gauge or at 358 degrees F., or at 150 pounds per square inch absolute.

This increase in solubility of potassium oxide is due to the decomposition of the potassium-aluminosilicate and is almost 27 percent over the solubility at atmospheric pressure. Since 50 ml. of solution resulted from extraction of 10 grams of dust, the total amount of potassium oxide contained in the extract is: $0.016 \times 50 = 0.80$ gram or:

$$\frac{0.80 \times 100}{10} = 8 \text{ percent of the dust}$$

It is possible therefore, to dissolve 90 percent of the total amount of potassium oxide (8.96) contained in the flue dust at a pressure of 135 p.s.i.g., or 150 p.s.i.a.

The present process is particularly directed to the recovery of potassium sulphate which will produce an economic return for the cement plant.

OPERATION

Mechanical features of the present process involved are shown in the flow sheet FIG. 4 for the recovery of potassium sulphate from 200 tons of dust per day. The dust is drawn from the bins under the electrostatic precipitators into two closed tanks with the water where it is agitated. The steam pressure in the tanks is adjusted up to 150 p.s.i.a. (135 p.s.i.g.) and the entire operation of extraction takes place in 30 minutes approximately. Then the entire mixture is discharged into the hold tank and from there into the continuous rotary filter of a porous medium, such as canvas.

The solution with the wash water containing about 4.5 percent potassium sulphate is drawn into the evaporator where it is concentrated to 19.4 percent. The thick solution is neutralized by sulphuric acid and is passed to the crystallizer. The potassium salt is then centrifuged and the mother liquor with a 10 percent concentrate of $K_2SO_4$ is recycled to the evaporation process, while the salt is passed through the rotary dryer and is then ready to market.

On the basis that 200 tons per day of flue-dust are to be extracted with a water to dust ratio of 3 to 1, for the recovery of potassium sulphate by a plant operating 300 days per year the overall material balance of the process is:

| | Tons |
|---|---|
| Potassium sulphate contained in the dust is | 33.2 |
| Potassium sulphate in extracted solution is | 29.6 |
| Potassium sulphate in filtrated solution is | 27.9 |
| Potassium sulphate in evaporator discharge is | 27.9 |
| Potassium sulphate recovered is | 27.9 |

Therefore, the recovery of potassium sulphate from the extraction of the dust is practically $$\frac{27.90 \times 100}{33.2} = 84 \text{ percent}$$

The results of the foregoing experimental work indicate that the optimum conditions for water extraction were at a liquid to solid ratio of 3 to 1 and at a temperature of 358 degrees F. It appears that it is possible to dissolve 90 percent of the potassium oxide contained in the kiln dust on a laboratory scale. When the recovery is practiced on an industrial scale, considering losses, up to 84 percent of the total amount of potassium oxide in kiln flue dust can be recovered by the present process.

In addition to this, the value of the washed cake should be considered, because after filtration, it is suitable to be recycled in the burning process with the slurry.

Briefly stated, the present process consists in treating the kiln dust with hot water at a temperature of approximately 358 degrees F. or a pressure of 150 pounds per square inch absolute and removing the liquid from the inert solids. The present process is therefore directed to the removal of the alkali content of the cement kiln flue dust. These alkali compounds include soluble alkali sulphates and insoluble alkali aluminosilicates.

When 90 percent of the total alkali is dissolved, the liquid from the remaining inert solids is removed after which said remaining solids may be recycled to the burning process with the raw mixture.

The present leaching process is primarily directed to the recovery of the alkali content of exhaust kiln flue dusts for the production of usable potassium sulphate, and the recycling of the reduced flue dusts into the cement manufacturing process.

Taking into consideration the ingredient content of the flue dusts, in addition to the potassium sulphate, there is also separated from said dust with the potassium sulphate, quantities of sodium sulphate and calcium sulphate in accordance with the following reactions:

(1) $K_2O$ plus $SO_3$ plus $H_2O = K_2SO_4$ plus $H_2O$
(2) $Na_2O$ plus $SO_3$ plus $H_2O = Na_2SO_4$ plus $H_2O$
(3) $Ca(OH)_2$ plus $CO_2 = CaCO_3$ plus $H_2O$
   $CaCO_3$ plus $SO_3$ plus $H_2O = CaSO_4$ plus $CO_2$ plus $H_2O$
   $Ca(OH)_2$ plus $SO_3 = CaSO_4$ plus $H_2O$ Approximately 69 percent of the potassium oxide combines to produce soluble potassium sulphate. Approximately 46 percent of the sodium oxide combines to produce sodium sulphate. Approximately 31 percent of the potassium oxide and 54 percent of the sodium oxide combines with the $SiO_2$ and $Al_2O_3$ in producing normally insoluble alkali aluminosilicates.

These are hydrolyzed in the steam pressure process to produce hydroxides of the alkalies, which when combined with sulphuric acid ($H_2SO_4$) produce potassium and sodium sulphate, as above indicated.

In the present process, the filtrate therefore contains in mixture potassium, sodium and calcium sulphates. The silica ($SiO_2$) and alumina ($Al_2O_3$) are precipitated and filtered out for return to the kiln in the recycling of the extracted flue dust.

As above described, the potassium, sodium and calcium sulphates are combined in solution, boiled to concentrate the same, are crystallized, centrifuged and dried.

The dry salt produced is a mixture of potassium sulphate, over 80 percent approximately, and sodium sulphate, less than 20 percent approximately, as well as a small quantity of calcium sulphate.

Having described my invention, reference should now be had to the following claims.

I claim:

1. The method of extracting and recovering potassium sulphate from cement kiln flue dust comprising agitating and mixing the dust within a closed container with approximately 3 parts water to 1 part dust, maintaining a temperature of approximately 358 degrees F. (pressure 150 p.s.i.a.) for a period of approxiately 30 minutes, filtering the solution and evaporating some of the water, therefore concentrating the filtrate.

2. In the method of claim 1, the further steps of neutralizing the filtrate with sulphuric acid, crystallizing the potassium sulphate, separating the same from the remaining solution, and drying.

3. The method of extracting and recovering potassium sulphate from cement kiln flue dust comprising agitating and mixing the dust within a closed container with approximately 2.5–3 parts water to 1 part dust, maintaining a temperature of approximately 358 degrees F., for a period of approximately 30 minutes, filtering the solution and evaporating some of the water therefor concentrating the filtrate.

4. The method of extracting and recovering potassium sulphate from cement kiln flue dust comprising agitating and mixing the dust within a closed container with approximately 2.5–3 parts water to 1 part dust, maintaining a steam pressure of approximately 135 to 150 pounds per square inch absolute for a period of approximately 30 minutes, filtering the solution, and evaporating some of the water concentrating the filtrate.

5. In the method of claim 2, said separation being a centrifugal separation.

6. The method of extracting and recovering a substantial part of the alkali content of cement kiln flue dust comprising agitating and mixing the dust within a closed container with approximately 3 parts water to 1 part dust, maintaining a temperature of approximately 358 degrees F. (pressure 150 p.s.i.a.) for a period of approximately 30 minutes, filtering the solution, evaporating some of the water, therefore concentrating the filtrate, and recycling the residual flue dust after removal of said alkali content, into the cement making process.

References Cited in the file of this patent

UNITED STATES PATENTS 2,871,133     Palonen _____ Jan. 27, 1959